United States Patent [19]

Schafer

[11] Patent Number: 4,489,463
[45] Date of Patent: Dec. 25, 1984

[54] PIPE CLAMP

[75] Inventor: Gunter Schafer, Frankfurt, Fed. Rep. of Germany

[73] Assignee: Security Lumber & Supply Co., Bradley, Ill.

[21] Appl. No.: 478,259

[22] Filed: Mar. 24, 1983

[51] Int. Cl.³ ............................................. B65D 63/02
[52] U.S. Cl. .................................... 24/277; 24/20 R; 285/DIG. 22
[58] Field of Search ............... 24/277, 278, 279, 20 R, 24/20 EE, 21, 703, 704; 285/420, D22; 248/74.7; 292/321, 322

[56] References Cited

U.S. PATENT DOCUMENTS

| | | | |
|---|---|---|---|
| 1,830,950 | 11/1931 | Lake | 292/322 |
| 2,741,938 | 4/1956 | Johnson . | |
| 2,993,255 | 7/1961 | Jagiel | 24/277 |
| 3,712,655 | 1/1973 | Fuehrer | 292/321 |
| 3,984,134 | 10/1976 | Engman et al. | 24/277 |
| 4,015,313 | 4/1977 | Oldford . | |
| 4,317,262 | 3/1982 | Wells, Jr. | 248/74.5 |
| 4,372,017 | 2/1983 | Heckethorn | 285/420 |
| 4,403,378 | 9/1983 | Engman | 24/277 |
| 4,405,161 | 9/1983 | Young et al. | 285/D22 |
| 4,407,050 | 10/1983 | Offterdinger | 24/277 |

FOREIGN PATENT DOCUMENTS

| | | | |
|---|---|---|---|
| 1411681 | 12/1968 | Fed. Rep. of Germany | 24/16 PB |
| 867116 | 5/1961 | United Kingdom | 24/16 PB |

Primary Examiner—Victor N. Sakran
Attorney, Agent, or Firm—Wood, Dalton, Phillips, Mason & Rowe

[57] ABSTRACT

A pipe clamp has a U-bolt with legs each of which is provided with first and second tandemly arranged frustoconical circumferential ribs with planar annular bases that define the distal margins of circumferential grooves in the U-bolt legs, and a C-shaped sheet metal saddle having a hollow body portion with inside edges that are separated by a space less than the maximum width of the body portion. The saddle has circumferentially slit extremities each of which has aligned transverse internal flanges with opposed inner margins that define split circular openings which are dimensioned to permit the flanges to snap around the circumferential ribs and engage in the grooves. The U-bolt and saddle are adapted to loosely encircle a pipe when the flanges are engaged in the first grooves, and are adapted to firmly clamp the pipe when the flanges are engaged in the second grooves.

6 Claims, 6 Drawing Figures

U.S. Patent  Dec. 25, 1984  4,489,463
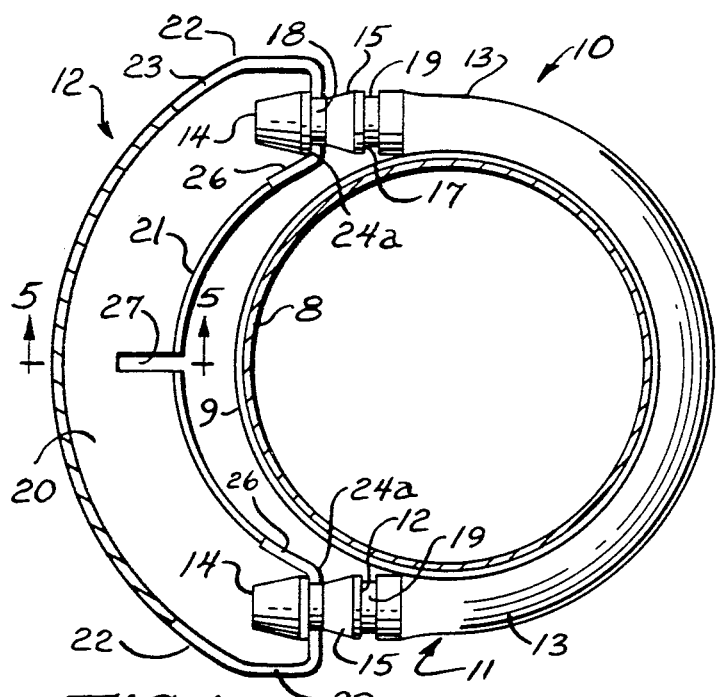
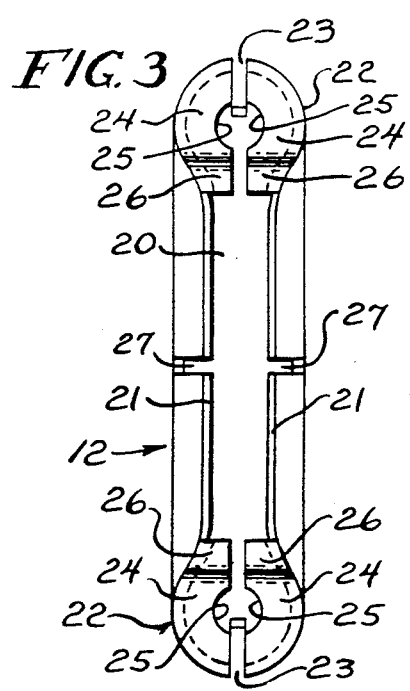
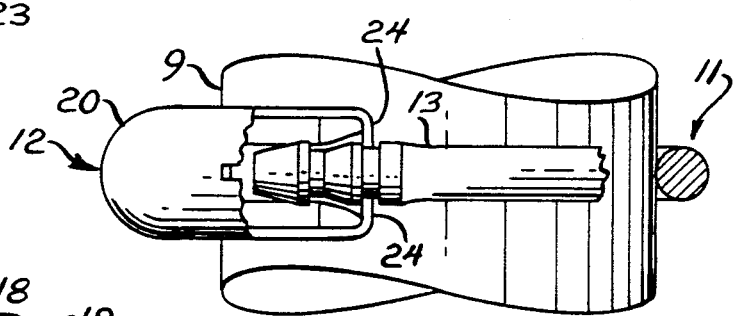
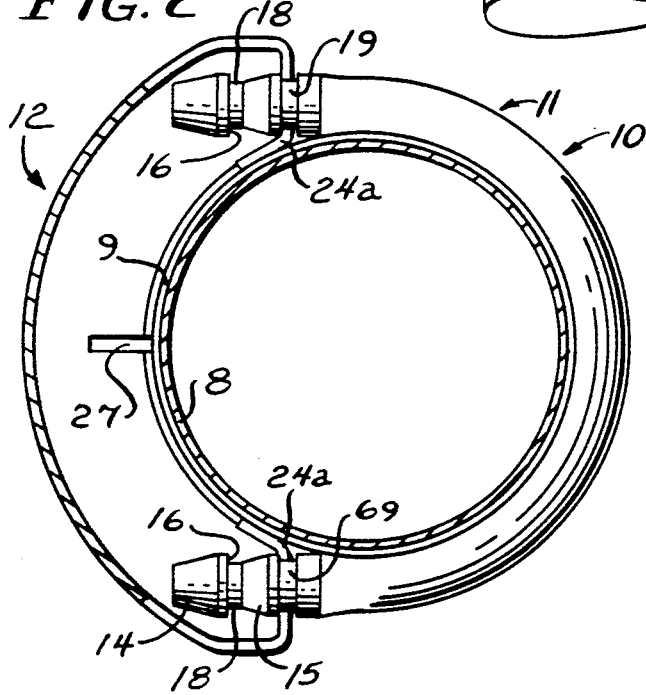
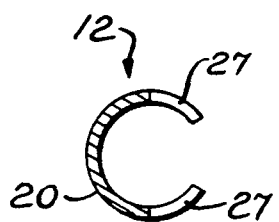
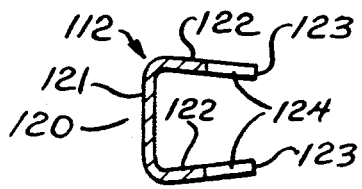

PIPE CLAMP

BACKGROUND OF THE INVENTION

There are a number of assembly operations in which two lengths of pipe must be joined with the end portion of one telescoped inside the end portion of another, and this is most easily done by the use of a U-bolt and cooperating arcuate saddle which is most commonly secured to the U-bolt by threading the legs of the U-bolt and using nuts to clamp the U-bolt and the saddle from around the pipe.

Probably the largest volume usage of such connections is in the automotive industry, where a muffler has one end connected to a pipe from the exhaust manifold or the catalytic converter, and has the tail pipe connected to its other end.

The difficulty with the conventional threaded U-bolt and nut arrangement is that it is relatively slow to apply even if a pneumatic torque wrench is used to tighten the nuts. Labor is a large item, and it is about the same whether the muffler and tail pipe are being mounted on a new automobile at the factory or are replacement parts being mounted in a service shop.

There have been a number of efforts to provide a U-bolt clamping structure which can be applied by the use of a compact hydraulic, pneumatic, or manual press; and the most pertinent of these known to applicant or his attorney is disclosed in Oldford U.S. Pat. No. 4,015,313, issued Apr. 5, 1977. Also pertinent is Johnson U.S. Pat. No. 2,741,938, issued Apr. 17, 1956, which discloses a threadless bolt and resilient retainer which could be adapted to a U-bolt and saddle construction.

In addition to the reduced labor costs which may be achieved by eliminating a threaded U-bolt and nuts, the mechanical components themselves may be considerably less expensive if precision threading of U-bolt and nuts can be avoided, and the long U-bolt shanks usually required can be reduced in length with a resultant material saving.

SUMMARY OF THE INVENTION

In accordance with the present invention, a pipe clamp comprises a U-bolt of predetermined radius of curvature and inside radius, and the U-bolt has legs each of which is provided with first and second tandemly arranged frustoconical circumferential ribs with planar annular bases that define the distal margins of circumferential grooves in the U-bolt legs. A C-shaped sheet metal saddle is of the same predetermined radius of curvature and inside radius so as to cooperate with the U-bolt, and is formed from sheet metal with a hollow body portion the inside edges of which are separated by a space less than the maximum width of the body portion. The saddle has circumferentially slit extremities each of which has aligned transverse internal flanges with opposed inner margins that define split circular openings which are dimensioned to permit the flanges to snap around the circumferential ribs of the U-bolt and engage in the grooves.

In applying the pipe clamp, the U-bolt and saddle are first loosely mounted around the pipes with the saddle flanges engaged in the first grooves of the U-bolt legs—i.e., the grooves nearer the distal ends of the legs; and the parts may then be squeezed in a pneumatic or hydraulic press, or between manually closed jaws of large mechanical advantage, to snap the flanges around the second ribs and into the second grooves where the U-bolt and saddle firmly clamp the pipe. The clamping action may be so heavy that the U-bolt and saddle actually deform the pipe by forming a shallow circumferential groove.

THE DRAWINGS

FIG. 1 is a central transverse sectional view of a preferred embodiment of the U-bolt and saddle of the present invention with the parts hung loosely upon a pair of telescoped pipes;

FIG. 2 is a view like FIG. 1 with the U-bolt and saddle firmly clamped onto the pipes;

FIG. 3 is a front elevation of the saddle of FIGS. 1 and 2, looking into the open inner side of the saddle;

FIG. 4 is a side elevational view with parts broken away, looking at the parts from below as seen in FIG. 2;

FIG. 5 is a fragmentary sectional view on an enlarged scale taken substantially as indicated along the line 5—5 of FIG. 1; and FIG. 6 is a view like FIG. 5 illustrating a second embodiment of the saddle.

DETAILED DESCRIPTION OF THE INVENTION

Referring to the drawings in detail, an inner pipe 8 and an outer pipe 9 are adapted to be connected to one another by means of the pipe clamp of the present invention, which is indicated generally at 10. The clamp consists of a U-bolt, indicated generally at 11, and a C-shaped saddle, indicated generally at 12. In order that the U-bolt and saddle may fit a pipe of any given diameter they must, of course, have the same predetermined radius of curvature and the same predetermined inside radius.

The U-bolt 11 has legs 13 each of which is provided with first and second tandemly arranged frusto-conical circumferential ribs numbered, respectively, 14 and 15. The ribs have respective planar annular bases 16 and 17 that define the distal margins of respective circumferential grooves 18 and 19.

The saddle 12 is fabricated of sheet metal, and has a hollow body portion 20 which, in the embodiment of FIGS. 1-5, has a cross section in the form of a segment of a circle with inside edges 21 that are separated by a space less than the maximum width of the body portion.

The saddle 12 has extremities 22 provided with circumferential slits 23, and each of the extremities has aligned transverse internal flanges 24 with opposed inner margins 25 that define split circular openings which are dimensioned to permit the flanges 24 to snap around the circumferential ribs 14 and 15 of the U-bolts 10 and engage in the grooves 18 and 19. The internal flanges 24 have locking lips 26 that lie in the space between the end portions of the inner edges 21 of the body portion 20, although such lips may be omitted provided the flange margins 24a abut the pipe.

In order that the entire saddle 12 may have a desired amount of flexibility, it is provided with a set of aligned radial slits 27 which are intermediate the extremities 22; and there may be more than one set if needed to provide sufficient flexibility.

Referring to FIG. 6, an alternative saddle structure 112 has a body portion 120 consisting of a substantially planar outside wall 121 and two substantially planar side walls 122 which converge toward inside edges 123 so that, as in the preferred saddle structure 12, the inside edges are separated by a space less than the maximum width of the body portion 120. The side walls 122 have aligned short slits 124 which extend radially from the inside edges 123. Except for the cross section of its body portion 120, the alternative saddle structure 112 is identical with the saddle structure 12.

In use, the U-bolt 10 is first placed around the overlapping extremities of pipes 8 and 9, and the saddle 12 or 112 is pressed onto it until the saddle flanges 24 snap over the first ribs 14 and engage in the grooves 18, so that the parts of the clamp loosely encircle the pipes as seen in FIG. 1. Thereafter, the assembly is completed by further pressing the saddle 12 or 112 onto the U-bolt 10 until the flanges 24 snap over the second frustoconical ribs 15 and into the grooves 19, in which position the U-bolt and saddle clamp the pipes 8 and 9 firmly together. The dimensions of the parts and manufacturing tolerances are so controlled that, in the "worst case", the U-bolt and saddle firmly grip the pipes. Variations in tolerances from the "worst case" condition merely cause the U-bolt 10 and saddle 12 to groove the pipes 8 and 9 for a firmer grip.

The parts of the clamp may be readily assembled on the pipes by means of a special clamping jaw operated by an air or hydraulic cylinder, or even by manual means if the lever arms offer sufficient mechanical advantage.

For reasons heretofore stated, the structure of the present invention offers savings both in cost of material and in labor costs over the conventional threaded U-bolt which is fastened to a saddle by threaded nuts.

The foregoing detailed description is given for clearness of understanding only and no unnecessary limitations should be understood therefrom, as modifications will be obvious to those skilled in the art.

I claim:
1. A pipe clamp comprising:
   a U-bolt of predetermined radius of curvature and inside radius, said U-bolt having legs each of which is provided with first and second tandemly arranged frustoconical circumferential ribs with planar annular bases that define the distal margins of first and second circumferential grooves in said U-bolt legs;
   and a C-shaped sheet metal saddle of said predetermined radius of curvature and inside radius, said saddle having a hollow body portion with inside edges that are separated by a space less than the maximum width of said body portion, and said saddle having extremities each of which is provided with a circumferential slit rendering said extremities resilient, and each of said extremities having inturned end portions forming aligned transverse internal flanges with opposed inner margins that define split circular openings which are dimensioned to permit said flanges to snap around said circumferential ribs and engage in said grooves by reason of the resilience of said extremities, said U-bolt and saddle being adapted to loosely encircle a pipe when the flanges are engaged in said first grooves, and being adapted to firmly clamp said pipe when said flanges are engaged in said second grooves.

2. The pipe clamp of claim 1 in which the cross section of the body portion of the saddle is a segment of a circle.

3. The pipe clamp of claim 2 in which the body portion has aligned short slits extending radially from its inside edges.

4. The pipe clamp of claim 1 in which the body portion of the saddle has a substantially planar outside wall and two substantially planar side walls which converge toward the inside edges of the body portion.

5. The pipe clamp of claim 4 in which the side walls have aligned short slits extending radially from the inside edges.

6. The pipe clamp of claim 1 in which the body portion has aligned short slits extending radially from its inside edges.

* * * * *